United States Patent
Ban

(10) Patent No.: US 9,028,340 B2
(45) Date of Patent: May 12, 2015

(54) FORMING METHOD AND GOLF CLUB HEAD

(71) Applicant: Bridgestone Sports Co., Ltd., Tokyo (JP)

(72) Inventor: Wataru Ban, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 132 days.

(21) Appl. No.: 13/828,264

(22) Filed: Mar. 14, 2013

(65) Prior Publication Data

US 2013/0281226 A1     Oct. 24, 2013

(30) Foreign Application Priority Data

Apr. 24, 2012  (JP) ................. 2012-099180

(51) Int. Cl.
    *A63B 53/04*   (2006.01)
    *B23K 26/36*   (2014.01)

(52) U.S. Cl.
    CPC .............. *B23K 26/367* (2013.01); *A63B 53/04* (2013.01); *A63B 2053/0445* (2013.01); *A63B 53/047* (2013.01); *A63B 53/0466* (2013.01)

(58) Field of Classification Search
    CPC ..................... A63B 2053/0445; B23K 26/367
    USPC ................................. 473/330–331
    See application file for complete search history.

(56) References Cited

U.S. PATENT DOCUMENTS

| | | | |
|---|---|---|---|
| 1,965,954 A | 7/1934 | Davis | |
| 3,869,126 A | 3/1975 | Thompson | |
| 5,029,864 A | 7/1991 | Keener | |
| 5,618,239 A | 4/1997 | Rife | |
| 5,688,190 A | 11/1997 | Rowland et al. | |
| 5,690,561 A | 11/1997 | Rowland et al. | |
| 5,709,616 A | 1/1998 | Rife | |
| 6,710,287 B2 | 3/2004 | Lu | |
| 6,713,717 B2 | 3/2004 | Takeda | |
| 6,719,644 B2 * | 4/2004 | Beach | 473/330 |
| 7,258,627 B2 * | 8/2007 | Chappell | 473/331 |
| 7,278,928 B2 * | 10/2007 | Newman et al. | 473/342 |
| 7,445,561 B2 | 11/2008 | Newman et al. | |
| 7,594,863 B2 | 9/2009 | Ban | |
| 7,674,188 B2 | 3/2010 | Ban | |
| 7,677,990 B2 | 3/2010 | Ban | |
| 7,695,377 B2 | 4/2010 | Yamagishi et al. | |
| 7,815,521 B2 | 10/2010 | Ban et al. | |
| 7,819,756 B2 | 10/2010 | Ban et al. | |
| 7,828,671 B2 | 11/2010 | Ban | |
| 7,846,040 B2 | 12/2010 | Ban | |
| 7,878,923 B2 | 2/2011 | Yamagishi et al. | |
| 7,901,297 B2 | 3/2011 | Ban et al. | |
| 7,976,404 B2 * | 7/2011 | Golden et al. | 473/330 |
| 8,021,245 B2 * | 9/2011 | Beach | 473/331 |
| 8,033,929 B2 * | 10/2011 | Yamagishi et al. | 473/330 |
| 8,092,320 B2 | 1/2012 | Yamagishi et al. | |

(Continued)

FOREIGN PATENT DOCUMENTS

| | | |
|---|---|---|
| JP | 08-000777 A | 1/1996 |
| JP | 08-229169 A | 9/1996 |

(Continued)

*Primary Examiner* — Stephen Blau
(74) *Attorney, Agent, or Firm* — Sughrue Mion, PLLC

(57) ABSTRACT

This invention provides a method of forming a fine groove with a width smaller than that of a scoreline in a golf club head. The method according to this invention includes a first step of forming a base groove in a face surface as a base of the fine groove, and a second step of forming a recess in at least one side wall of the base groove to reduce the angle between this side wall and the face surface.

8 Claims, 5 Drawing Sheets

(56) References Cited

U.S. PATENT DOCUMENTS

| | | |
|---|---|---|
| 8,113,965 B2 | 2/2012 | Ban |
| 8,128,511 B2 * | 3/2012 | Golden et al. ............... 473/330 |
| 8,172,699 B2 * | 5/2012 | Nakamura ................... 473/330 |
| 8,382,608 B2 * | 2/2013 | Solheim ....................... 473/329 |
| 8,517,861 B2 * | 8/2013 | Golden et al. ............... 473/330 |
| 8,579,723 B2 * | 11/2013 | Nakamura ................... 473/331 |
| 2005/0181310 A1 | 8/2005 | Yang et al. ................... 430/320 |
| 2008/0125241 A1 | 5/2008 | Tateno et al. |
| 2009/0318243 A1 * | 12/2009 | Golden et al. ............... 473/331 |
| 2011/0034262 A1 | 2/2011 | Takechi et al. |
| 2011/0081985 A1 | 4/2011 | Yamagishi et al. |
| 2011/0201448 A1 * | 8/2011 | Myodo et al. ................ 473/331 |
| 2011/0269567 A1 | 11/2011 | Ban et al. |
| 2011/0269568 A1 | 11/2011 | Ban |
| 2012/0184391 A1 * | 7/2012 | Johnson et al. .............. 473/328 |
| 2013/0225319 A1 * | 8/2013 | Kato ............................. 473/331 |

FOREIGN PATENT DOCUMENTS

| | | |
|---|---|---|
| JP | 09-070457 A | 3/1997 |
| JP | 09-253250 A | 9/1997 |
| JP | 2002-224250 A | 8/2002 |
| JP | 2003-033454 A | 2/2003 |
| JP | 2003-299753 A | 10/2003 |
| JP | 2004-141277 A | 5/2004 |
| JP | 2004-142343 A | 5/2004 |
| JP | 2005-224383 A | 8/2005 |
| JP | 2007-325859 A | 12/2007 |
| JP | 2008-023178 A | 2/2008 |
| JP | 2008-132168 A | 6/2008 |
| JP | 2008-132169 A | 6/2008 |
| JP | 2008-136619 A | 6/2008 |
| JP | 2008-136833 A | 6/2008 |
| JP | 2008-154975 A | 7/2008 |
| JP | 2009-261886 A | 11/2009 |
| JP | 2010-088678 A | 4/2010 |
| JP | 2010-240263 A | 10/2010 |
| JP | 2011-000194 A | 1/2011 |
| JP | 2011-030883 A | 2/2011 |
| JP | 2011-234748 A | 11/2011 |
| JP | 2011-234749 A | 11/2011 |
| WO | 97/28553 A1 | 8/1997 |

* cited by examiner

F I G. 5
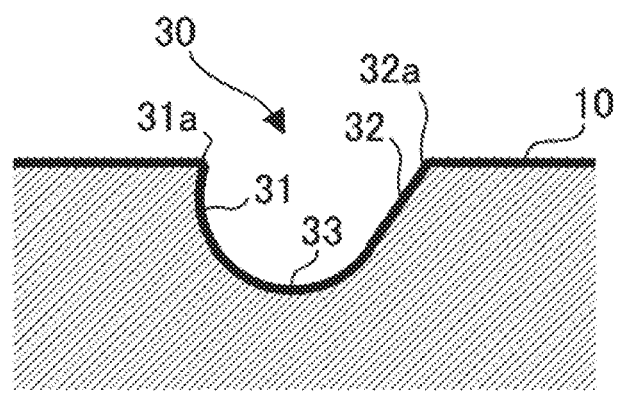

FORMING METHOD AND GOLF CLUB HEAD

BACKGROUND OF THE INVENTION

1. Field of the Invention

The present invention relates to a golf club head.

2. Description of the Related Art

In general, a plurality of parallel linear grooves are formed in the face surface of a golf club head to extend in the toe-to-heel direction (for example, Japanese Patent Laid-Open Nos. 2002-224250 and 2004-141277). These grooves are called, for example, scorelines, marking lines, or face lines (they will be referred to as scorelines in this specification). These scorelines have an effect of increasing the back spin amount on a struck golf ball, or suppressing a significant decrease in back spin amount on a struck golf ball upon a shot in rainy weather or that from the rough. A technique of forming grooves finer than scorelines in the face surface to increase the back spin amount, and suppress a decrease in back spin amount in, for example, rainy weather has also been proposed (for example, Japanese Patent Laid-Open Nos. 2011-234748 and 2011-234749).

The use of only scorelines has a limit in the effect of increasing the back spin amount, and suppressing a decrease in back spin amount in, for example, rainy weather. Especially in an athletic golf club head, the specifications of scorelines are subject to a constraint associated with a specific rule, so it is difficult to further increase the back spin amount. It is therefore desired to further improve the effect of increasing the back spin amount, and suppressing a decrease in back spin amount in, for example, rainy weather, using grooves finer than scorelines.

SUMMARY OF THE INVENTION

It is an object of the present invention to improve the effect of increasing the back spin amount, and suppressing a decrease in back spin amount, using grooves finer than scorelines.

According to an aspect of the present invention, there is provided a method of forming a fine groove with a width smaller than a width of a scoreline in a golf club head, the method comprising: a first step of forming a base groove in a face surface as a base of the fine groove; and a second step of forming a recess in at least one side wall of the base groove to reduce an angle between the one side wall and the face surface.

According to another aspect of the present invention, there is provided a golf club head including a plurality of parallel scorelines formed in a face surface, and a fine groove which is formed in the face surface and has a width smaller than a width of the scoreline, wherein a recess is formed in one side wall of the fine groove so that an angle between the one side wall and the face surface becomes smaller than before the recess is formed.

Further features of the present invention will become apparent from the following description of exemplary embodiments with reference to the attached drawings.

BRIEF DESCRIPTION OF THE DRAWINGS

FIG. 5 is a sectional view of a fine groove when ridged portions are removed.

DESCRIPTION OF THE EMBODIMENTS

Figure 1:
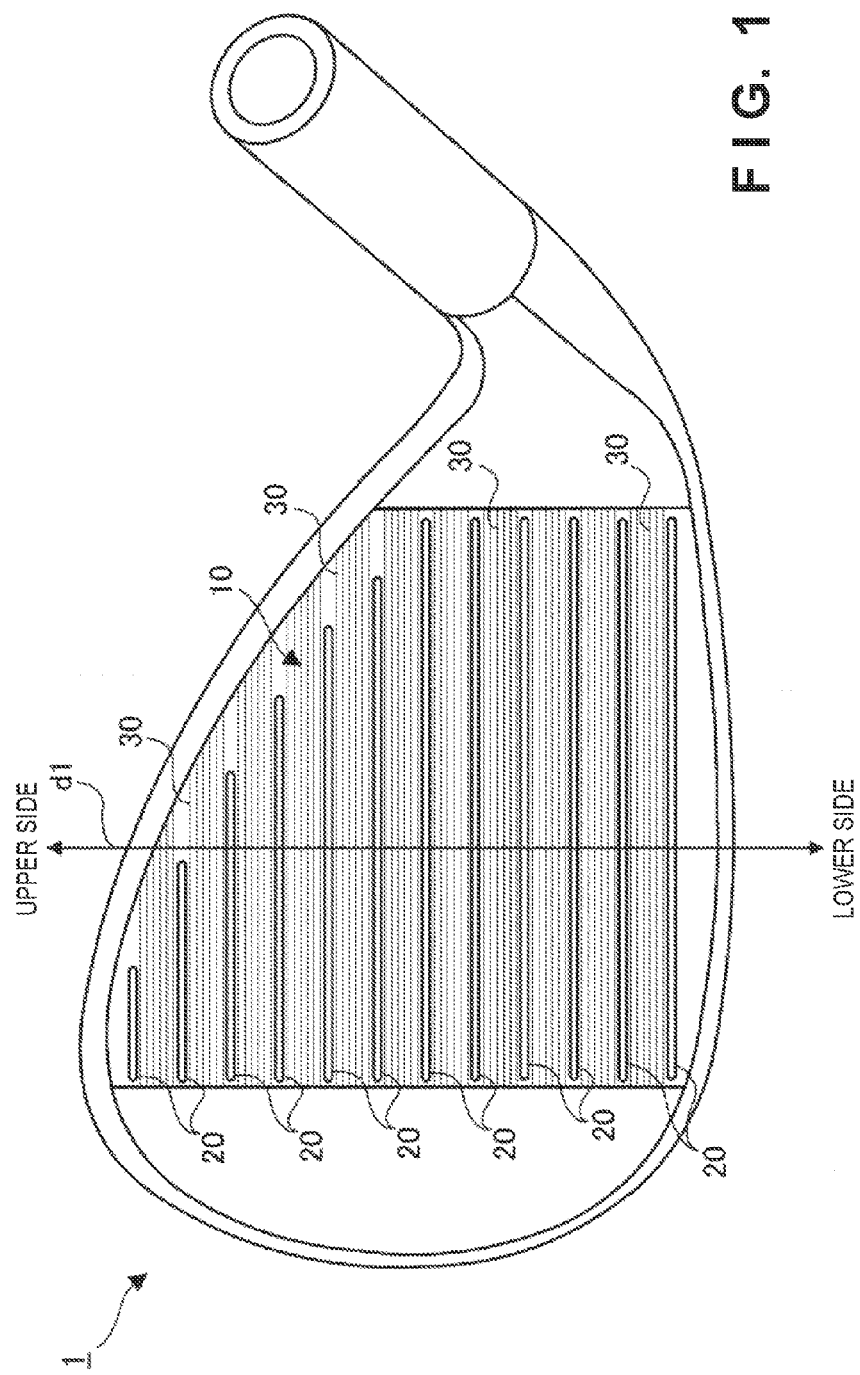
FIG. 1 is an external view of a golf club head according to an embodiment of the present invention.
Figure 2:
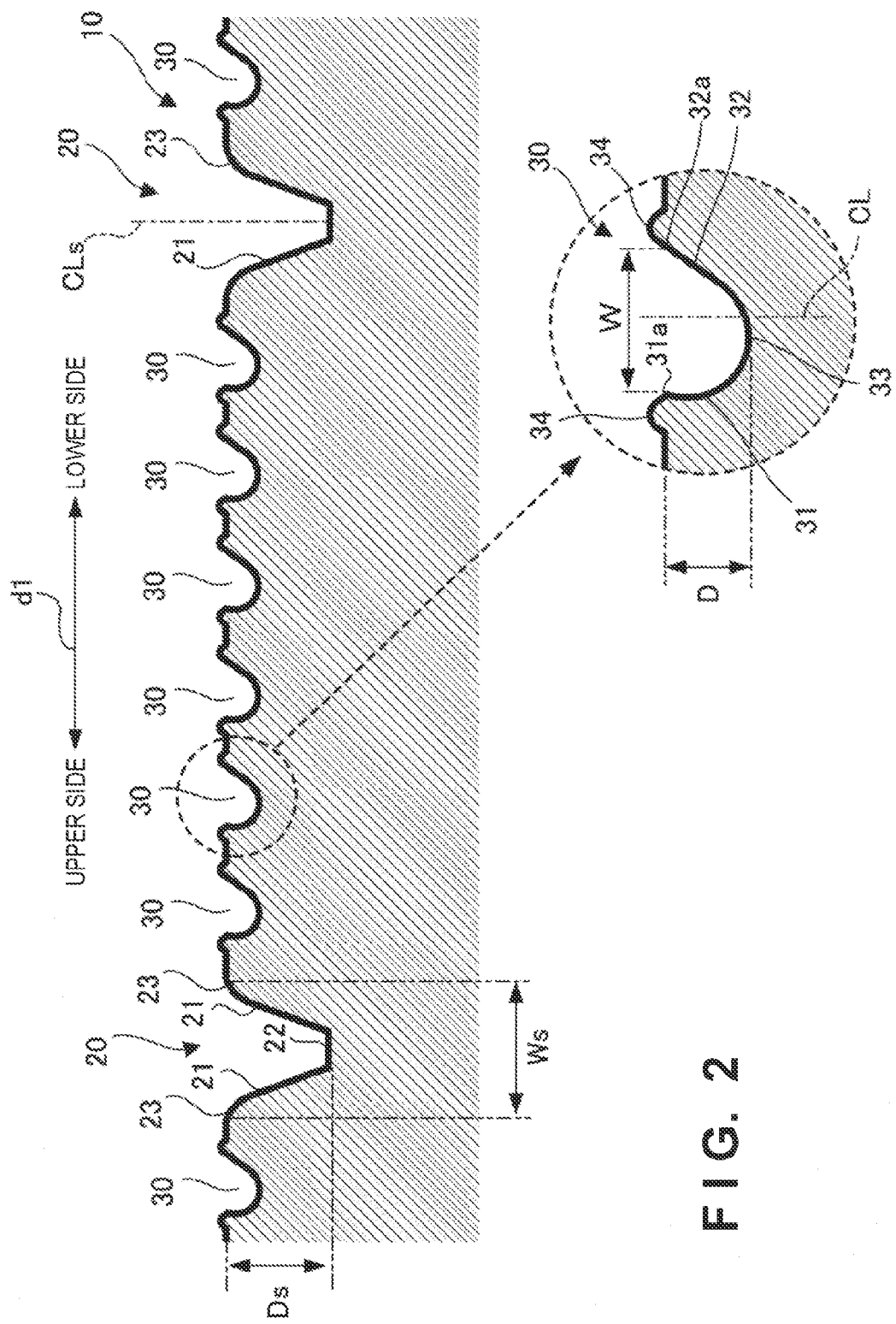
FIG. 2 shows a sectional view of scorelines and fine grooves, and a partial enlarged view of the fine groove.

FIG. 1 is an external view of a golf club head 1 according to an embodiment of the present invention, and FIG. 2 shows a sectional view of scorelines 20 and fine grooves 30 in a direction perpendicular to their longitudinal direction (toe-to-heel direction), and a partial enlarged view of the fine groove 30.

FIGS. 1 and 2 illustrate an example in which the present invention is applied to an iron golf club head. The present invention is suitable for an iron golf club head, and especially for middle iron, short iron, and wedge golf club heads. More specifically, the present invention is suitable for a golf club head with a loft angle of 30° (inclusive) to 70° (inclusive), and a head weight of 240 g (inclusive) to 320 g (inclusive). However, the present invention is also applicable to wood and utility (hybrid) golf club heads.

The golf club head 1 has a plurality of scorelines 20 formed in its face surface (striking surface) 10. The plurality of scorelines 20 are parallel linear grooves that are formed to extend in the toe-to-heel direction, and align themselves in a direction d1 perpendicular to the longitudinal direction of the scorelines 20. Referring to FIGS. 1 and 2, the upper and lower sides are defined when the sole portion of the golf club head 1 is grounded.

Although the scorelines 20 are aligned at equal intervals (equal pitches) in this embodiment, they may be aligned at different intervals. In this embodiment, each scoreline 20 has the same cross-sectional shape throughout its entire longitudinal portion except for its two ends (toe- and heel-side ends). Also, the scorelines 20 have the same cross-sectional shape.

Each scoreline 20 includes a pair of side walls 21 and a bottom wall 22, and has a trapezoidal cross-sectional shape bilaterally symmetric about a center line CLs. Note that the cross-sectional shape of the scoreline 20 is not limited to a trapezoidal shape, and may be other shapes such as a V shape. Rounded portions are formed on edges 23 of each scoreline 20. The radius of the rounded portion is, for example, 0.05 mm (inclusive) to 0.3 mm (inclusive).

A depth Ds of the scoreline 20 (the distance between the bottom wall 22 and the face surface 10) is preferably 0.3 mm or more. When the golf club head 1 is intended for athletics, the depth Ds is set to 0.5 mm or less to comply with a relevant rule. A width Ws (the width defined by the 30-degree measurement method) of the scoreline 20 is preferably 0.6 mm or more. When the golf club head 1 is intended for athletics, the width Ws is set to 0.9 mm or less to comply with a relevant rule.

The plurality of fine grooves 30 are formed in the face surface 10. The fine groove 30 has a width W smaller than the width Ws of the scoreline 20. In this embodiment, linear fine grooves 30 are formed to extend parallel to the scorelines 20. However, fine grooves 30 may be formed in the direction in which they intersect with the scorelines 20, or formed in a curve (an arcuated shape such as a circular arc or an elliptic arc). Nevertheless, it is more desirable to form linear fine grooves 30 in terms of machinability. Although each fine groove 30 is formed in one straight line shape, it may be formed as a discontinuous line.

A plurality of fine grooves 30 are formed in each region between adjacent scorelines 20. Although no fine grooves 30 are formed in the side regions of the scorelines 20 in the longitudinal direction, fine grooves 30 may be formed in these regions.

Each fine groove 30 includes an upper side wall 31, lower side wall 32, and bottom wall 33, and has a cross-sectional shape bilaterally asymmetric about a center line CL in the direction of the width W. Although the fine grooves 30 have the same cross-sectional shape, they may have different cross-sectional shapes. The width W is equivalent to the interval between edge portions 31a and 32a. The width W is, for example, 50 μm (inclusive) to 400 μm (inclusive).

The edge portion 31a is the boundary portion between the face surface 10 and the side wall 31, while the edge portion 32a is the boundary portion between the face surface 10 and the side wall 32. Ridged portions 34 are formed on the two sides of each fine groove 30. The ridged portions 34 are formed by forming fine grooves 30 using laser machining. This operation will be described in detail later.

A depth D of the fine groove 30 is preferably 10 μm or more to drain, for example, water on the face surface 10. When the golf club head 1 is intended for athletics, the depth D is set to 25 μm or less to comply with a relevant rule. In addition, when the golf club head 1 is intended for athletics, the specifications of the scorelines 20 and fine grooves 30 are designed to comply with a relevant rule.

In this embodiment, the frictional force between the face surface 10 and the golf ball can be increased by forming fine grooves 30 each having a width smaller than that of the scoreline 20. This makes it possible to increase the back spin amount on a struck golf ball, and suppress a decrease in back spin amount in, for example, rainy weather. Especially since the edge portion 31a is steeper than that of the edge portion 32a, it can increase the frictional force between the face surface 10 and the golf ball more. Also, since the ridged portions 34 are formed, they can increase the frictional force between the face surface 10 and the golf ball more.

Note that when the golf club head 1 is intended for athletics, the height (amount of protrusion) of the ridged portion 34 from the face surface 10 is preferably 5 μm or less to comply with a relevant rule. Also, the surface roughness of the face surface 10 is preferably 180 μ·inch or less in the use of a contracer having a contact stylus with a tip angle of 30° to 60°.

Figure 3:
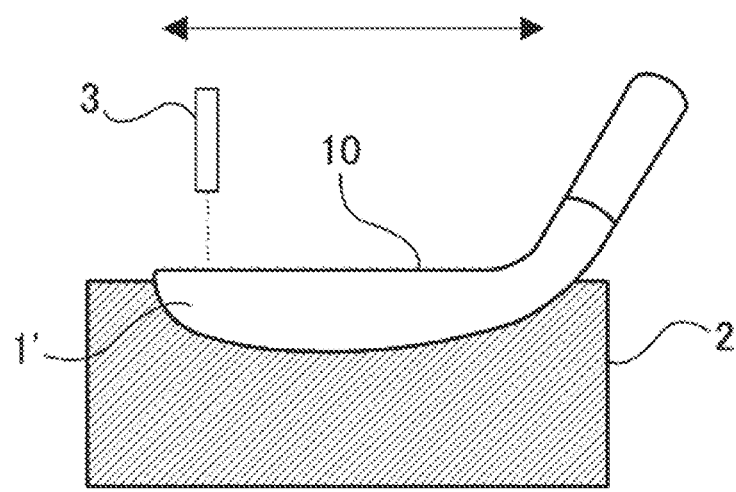
FIG. 3 is a view for explaining a method of forming fine grooves.
Figure 4:
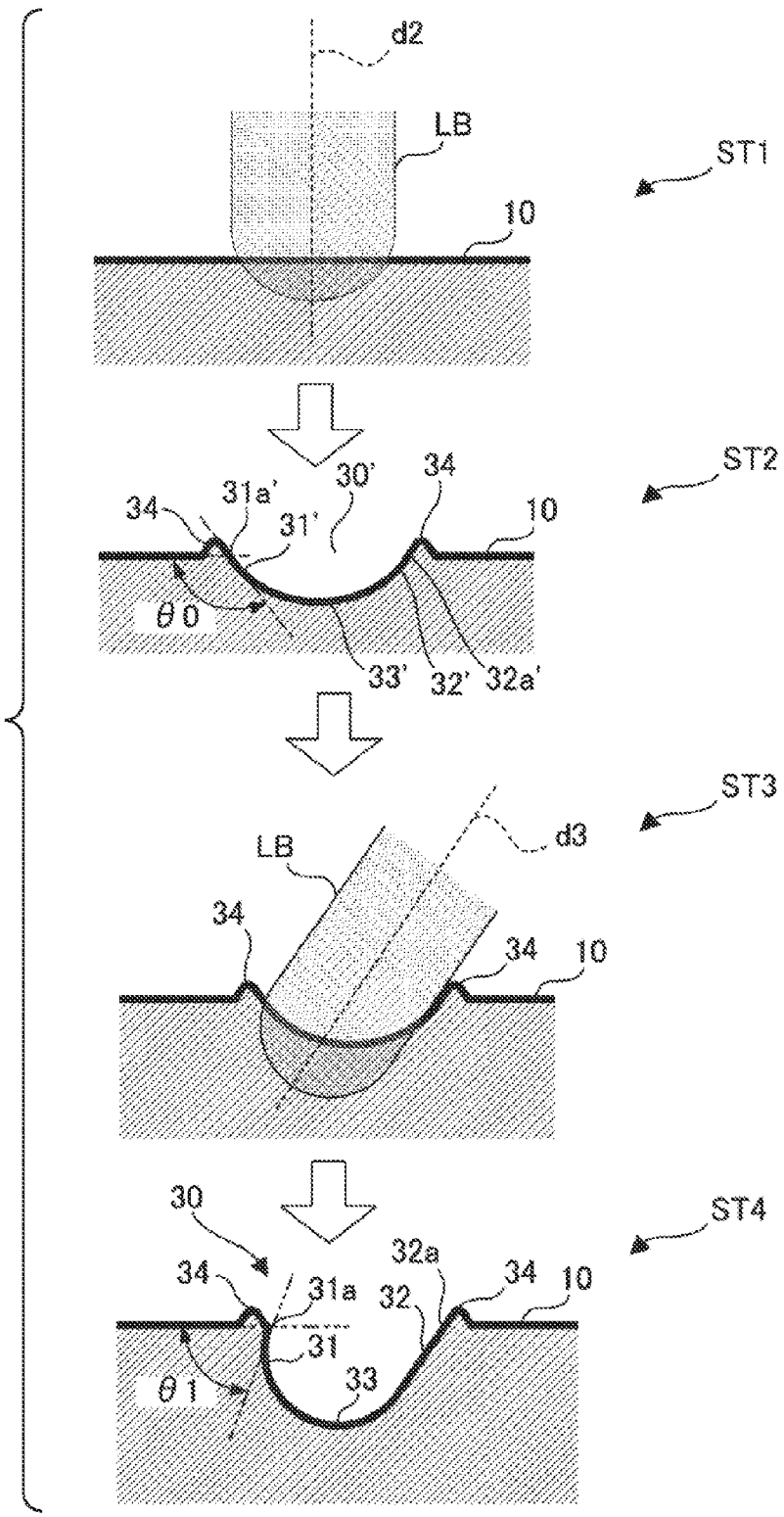
FIG. 4 shows views for explaining the method of forming fine grooves.

A method of forming fine grooves 30 will be described next with reference to FIGS. 3 and 4. Note that the face surface 10 may be formed integrally with the golf club head 1, or a face member and head body which constitute the face surface 10 may be provided as separate members and bonded to each other.

The case wherein fine grooves 30 are formed by laser machining will be described in this embodiment. As shown in FIG. 3, a primary shaped product 1' in which fine grooves 30 are to be formed is fixed to a machining device (not shown) through a jig 2. The machining device includes an irradiation unit 4 which emits laser beam. Fine grooves 30 are formed while irradiating the face surface 10 with laser beam emitted by the irradiation unit 4, and relatively moving the face surface 10 (primary shaped product 1') or irradiation unit 4 in the direction in which fine grooves 30 are formed.

Fine grooves 30 are formed in two steps. FIG. 4 shows views for explaining a method of forming fine grooves 30. First, base grooves are formed in the face surface 10 as a base of fine grooves 30 (first step). In a state ST1, the face surface 10 of the primary shaped product 1' is irradiated with laser beam LB. In this case, the direction in which the face surface 10 is irradiated with the laser beam LB is defined as a direction d2 perpendicular to the face surface 10, and the face surface 10 (primary shaped product 1') or irradiation unit 4 is relatively moved in the direction in which fine grooves 30 are formed.

With this operation, a base groove 30' shown in a state ST2 is formed. Upon the formation of the base groove 30' by laser machining, the base groove 30' is raised to spontaneously form ridged portions 34. The base groove 30' includes side walls 31' and 32' and a bottom wall 33', and is formed in an arcuated shape in the example shown in FIG. 4. The angle between the side wall 31' and the face surface 10 is defined as θ0. As in this embodiment, when the side wall 31' has a curved surface, the angle θ0 is defined between the face surface 10, and a tangent to an edge portion 31a' on which the side wall 31' and face surface 10 intersect with each other.

Next, a machining operation is performed to reduce the angle θ0 between the side wall 31' and the face surface 10 (second step). In the machining operation, the side wall 31' of the base groove 30' is irradiated with laser beam to form a recess in the side wall 31'.

In a state ST3, the side wall 31' is irradiated with the laser beam LB. In this case, the direction in which the side wall 31' is irradiated with the laser beam LB is defined as a direction d3 oblique with respect to the direction d2 perpendicular to the face surface 10, and the face surface 10 (primary shaped product 1') or irradiation unit 4 is relatively moved in the direction in which fine grooves 30 are formed.

As a result, fine grooves 30 are formed, as shown in a state ST4. The angle between the side wall 31 and the face surface 10 is defined as θ1 (<θ0). As in this embodiment, when the side wall 31 has a curved surface, the angle θ1 is defined between the face surface 10, and a tangent to the edge portion 31a on which the side wall 31 and face surface 10 intersect with each other. The smaller the angle θ1, the larger the back spin amount is expected to become. However, the edge portion 31a weakens when the angle θ1 is too small. Hence, the angle θ1 is preferably 60° (inclusive) to 110° (inclusive).

Note that the side wall 32' may also be irradiated with laser beam to form a recess in the side wall 32', thereby further reducing the angle between the side wall 32' and the face surface 10. However, the effect of increasing the back spin amount is likely to depend on the angle θ1 between the face surface 10 and the side wall 31 that is on the upper side at the time of impact. It is therefore preferable to form a recess only on the side of the side wall 31' to decrease the number of steps of machining.

With this operation, fine grooves 30 can be formed in this embodiment. In general, as a groove is formed to be finer, it becomes harder to form it to have a desired cross-sectional shape. However, fine grooves 30 can be relatively easily formed by irradiation with laser beam. At this time, it is also possible to irradiate the side wall 31' with laser beam in the state ST3 from the beginning, without forming a base groove 30'. However, when the side wall 31' is irradiated with laser beam in the state ST3 from the beginning, the laser beam is often reflected by the face surface 10, resulting in a failure in machining. In this embodiment, a desired cross-sectional shape can be relatively easily obtained by irradiating the side wall 31' with laser beam in two steps while changing the irradiation direction.

Although a base groove 30' is formed by laser machining in this embodiment, the present invention is not limited to this. A base groove 30' may be formed by, for example, cutting, forging, or etching. However, when a recess is formed in the side wall 31' by laser machining in the state ST3, it is effective to form a base groove 30' by laser machining. Also, a recess may be formed in the side wall 31' in the state ST3 using a machining method (for example, cutting or etching) other than laser machining. However, a recess can be relatively easily formed in the side wall 31' with high accuracy when laser machining is adopted.

Also, the ridged portions 34 may be removed. FIG. 5 illustrates the cross-sectional shape of a fine groove 30 when the ridged portions 34 are removed. The ridged portions 34 can be removed by, for example, cutting or polishing.

After the formation of the fine grooves 30, a surface treatment for increasing the hardness of the face surface 10 is preferably performed. Examples of such a surface treatment are a carburizing treatment, nitriding treatment, soft nitriding treatment, PVD (Physical Vapor Deposition) treatment, ion plating, DLC (Diamond-Like Carbon) treatment, and plating treatment. Especially surface treatments such as a carburizing treatment and nitriding treatment, which modify the surface without forming another metal layer on the surface, are preferable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-099180, filed Apr. 24, 2012, which is hereby incorporated by reference herein in its entirety.

What is claimed is:

1. A method of forming a fine groove with a width smaller than a width of a scoreline in a golf club head, the method comprising:
    a first step of forming abuse groove in a face surface as abuse of the fine groove; and
    a second step of forming a recess in at least one side wall of the base groove to reduce an angle between the one side wall and the face surface by irradiating the at least one side wall and a bottom wall of the base groove with laser beam,
    wherein the fine groove is formed into the head from a plane including edges of the scoreline.

2. The method according to claim 1, wherein in the second step, the face surface is irradiated with laser beam in a direction oblique with respect to a direction perpendicular to the face surface.

3. The method according to claim 1, wherein in the first step, the base groove is formed by irradiating the face surface with laser beam.

4. The method according to claim 1, wherein in the second step, the angle is set to 60° (inclusive) to 110° (inclusive).

5. The method according to claim 1, wherein
    a width of the fine groove is 50 μm (inclusive) to 400 μm (inclusive), and
    a depth of the fine groove is not less than 10 μm.

6. The method according to claim 1, wherein the fine groove is formed to extend parallel to the scoreline.

7. The method according to claim 6, wherein the one side wall is positioned on an upper side defined when a sole portion of the head is grounded with respect to the other side wall of the base groove.

8. A golf club head including
    a plurality of parallel scorelines formed in a face surface, and
    a fine groove which is formed in the face surface and has a width smaller than a width of the scoreline,
    wherein the fine groove is formed into the head from a plane including edges of the plurality of parallel scorelines. and
    a recess is formed in one side wall of the fine groove so that an angle between the one side wall and the face surface becomes smaller than before the recess is formed.

* * * * *